US008757454B2

(12) United States Patent
Dong et al.

(10) Patent No.: US 8,757,454 B2
(45) Date of Patent: Jun. 24, 2014

(54) FLUID DELIVERY SYSTEM

(75) Inventors: XiaoYou Dong, Dongguan (CN); XianZhi Zhou, Guangzhou (CN)

(73) Assignee: Reckitt & Colman (Overseas) Limited, Slough, Berkshire (GB)

( * ) Notice: Subject to any disclaimer, the term of this patent is extended or adjusted under 35 U.S.C. 154(b) by 0 days.

(21) Appl. No.: 13/382,283

(22) PCT Filed: Jul. 6, 2010

(86) PCT No.: PCT/GB2010/051110
§ 371 (c)(1),
(2), (4) Date: Mar. 27, 2012

(87) PCT Pub. No.: WO2011/004184
PCT Pub. Date: Jan. 13, 2011

(65) Prior Publication Data
US 2012/0187152 A1 Jul. 26, 2012

(30) Foreign Application Priority Data
Jul. 10, 2009 (GB) .................................. 0912065.0

(51) Int. Cl.
*B65D 5/72* (2006.01)
*B65D 25/40* (2006.01)
*B65D 35/38* (2006.01)
*B65D 88/54* (2006.01)
*G01F 11/00* (2006.01)
*A47K 5/12* (2006.01)
*B05B 11/00* (2006.01)

(52) U.S. Cl.
CPC ........... *A47K 5/1204* (2013.01); *B05B 11/3097* (2013.01)
USPC ....................................... 222/571; 222/321.3

(58) Field of Classification Search
USPC .......... 222/52, 63, 325, 571, 333, 375, 383.1; 251/82, 83; 417/443
See application file for complete search history.

(56) References Cited

U.S. PATENT DOCUMENTS 4,360,130 A 11/1982 Nishimura et al.
4,827,965 A * 5/1989 Wates ............................. 137/88
(Continued)

FOREIGN PATENT DOCUMENTS

CN 201135393 Y 10/2008
EP 0546817 A1 * 9/1992
(Continued)

OTHER PUBLICATIONS

PCT/GB2010/051110 Written Opinion.
Search Report for Priority Application GB 0912065.0.

* cited by examiner

*Primary Examiner* — Paul R Durand
*Assistant Examiner* — Benjamin R Shaw
(74) *Attorney, Agent, or Firm* — Troutman Sanders LLP; Ryan A. Schneider

(57) ABSTRACT

A fluid delivery system comprising a pump arranged to draw fluid, in use, from a reservoir (1) and dispense it through a dispensing tube (4), the pump comprising a cylinder (21) in which a piston (22) is reciprocally movable; an inlet into the cylinder; a one-way inlet valve (17) for controlling flow through the inlet; an outlet from the cylinder and leading to the dispensing tube; and an outlet valve (27) controlling flow through the outlet, wherein the piston is arranged to selectively contact the outlet valve to maintain it open during the initial portion of its downstroke and to allow it to close for the remainder of the downstroke.

11 Claims, 12 Drawing Sheets

(56) References Cited

U.S. PATENT DOCUMENTS

| | | | | | |
|---|---|---|---|---|---|
| 4,991,747 | A | * | 2/1991 | Van Brocklin | 222/321.3 |
| 5,305,916 | A | * | 4/1994 | Suzuki et al. | 222/52 |
| 5,445,288 | A | * | 8/1995 | Banks | 222/95 |
| 5,477,984 | A | * | 12/1995 | Sayama et al. | 222/52 |
| 5,816,453 | A | * | 10/1998 | Spencer et al. | 222/321.3 |
| 5,836,482 | A | * | 11/1998 | Ophardt et al. | 222/325 |
| 5,862,954 | A | * | 1/1999 | Ehrensperger et al. | 222/190 |

FOREIGN PATENT DOCUMENTS

| | | | | |
|---|---|---|---|---|
| EP | 0549817 | A1 | * | 9/1992 |
| EP | 0546817 | A1 | | 6/1993 |
| EP | 1604600 | A2 | * | 12/2005 |
| GB | 1117566 | A | | 6/1968 |
| GB | 2118254 | A | | 10/1983 |

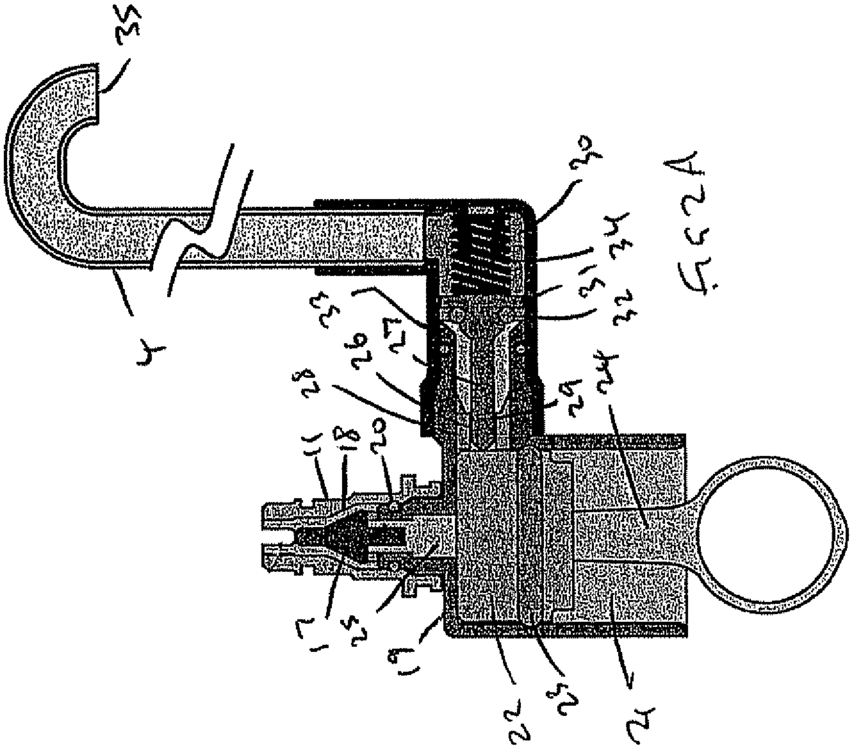

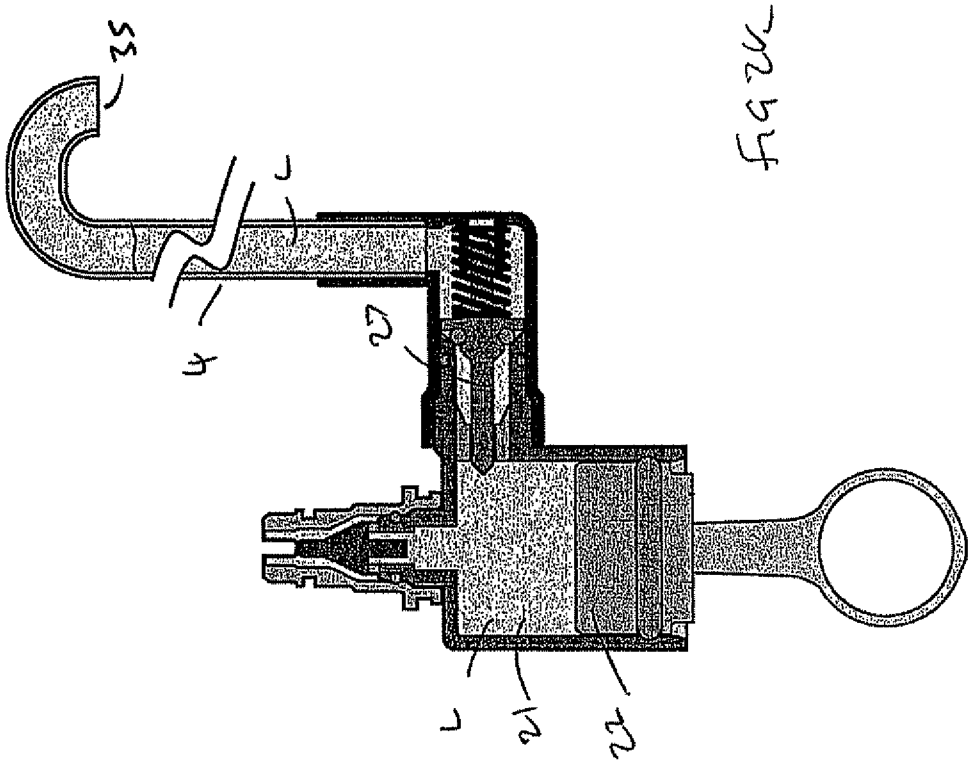

FLUID DELIVERY SYSTEM

CROSS-REFERENCE TO RELATED APPLICATIONS

This application is a US National Stage of International Application No. PCT/GB2010/051110, filed 6 Jul. 2010, which claims the benefit of GB 0912065.0, filed 10 Jul. 2009, both herein fully incorporated by reference.

FIELD OF THE INVENTION

The present invention relates to a fluid delivery system.

BRIEF SUMMARY OF THE INVENTION

It has been designed particularly for use with an automatic soap dispenser for use in a domestic environment. The soap dispenser is a battery-operated device with a replaceable reservoir of soap or the like which is placed in an upturned configuration over a base unit. The reservoir has an outlet with a valve at its lower end which prevents leakage of the liquid from the reservoir. The base has a spigot which enters the outlet thereby opening the valve to allow the liquid to flow into the base.

The base is provided with a battery compartment, a motor, a pump system, a dispensing tube and a sensor. When the user's hands are sensed by a sensor, the motor is activated to operate the pump and dispense liquid from the dispensing tube.

The present invention is directed to a fluid delivery system for use in the base unit which can prevent or significantly reduce unwanted dripping from the dispensing tube.

Although the fluid delivery system has been designed for use in such an application, it can be broadly applied to any fluid delivery system for dispensing fluid via a dispensing tube where it is necessary to prevent or reduce dripping.

One dispenser which can do this as disclosed in EP 1 604 600. This discloses the possibility of an ancillary piston and cylinder which operate downstream of the check valve, so that, upon the downstroke of the piston, the ancillary piston sucks fluid into the ancillary cylinder. It also discloses a piston having a pair of annular flexible disks which are arranged to reciprocate in cylinders of different dimensions. Downward movement of the piston increases the size of the chamber between the two disks, thereby generating a suction force which sucks back some of the dispensed product to reduce or prevent dripping.

According to a first aspect of the present invention there is provided a fluid delivery system comprising:

a pump arranged to draw fluid, in use, from a reservoir and dispense it through a dispensing tube, the pump comprising a cylinder in which a piston is reciprocally movable;

an inlet into the cylinder;

a one-way inlet valve for controlling flow through the inlet;

an outlet from the cylinder and leading to the dispensing tube; and an outlet valve controlling flow through the outlet, wherein the piston is arranged to selectively contact the outlet valve to maintain it open during the initial portion of its downstroke and to allow it to close for the remainder of the downstroke.

Because the piston holds the outlet valve open during the initial portion of its downstroke, liquid is sucked back through the outlet. It is therefore sucked back along the dispensing tube and dripping is prevented or reduced. By making use of existing components to do this, namely the piston and outlet valve, the invention provides a solution without having to employ additional devices, or specially made components of complex construction.

The outlet valve could be in the top wall of the cylinder and be arranged such that it moves downwardly with the piston, and has an orifice which only communicates with the outlet, once the piston has moved more than a predetermined distance below top dead centre. However, more preferably, the outlet valve comprises a valve element positioned in an orifice at the side wall of the cylinder and biased to a closed position in which the valve element projects into the cylinder, the valve element being arranged to be opened by the piston moving in the cylinder past the outlet valve element and pushing the projecting part of the valve element out of the cylinder against the action of the resilient biasing force. The inlet valve element may be biased into position. However, it is preferably a floating valve element.

The dispensing tube may have any configuration as the suction caused by the piston will create a back pressure which will maintain the liquid in the dispensing tube to some extent. Preferably, the dispensing tube comprises an upward portion extending away from the piston leading into a curved transitional portion, the curved transitional portion leading to a generally downwardly facing outlet. Preferably, the piston is configured to suck the liquid back to a location, which is back beyond the point where it could flow out of the outlet under gravity.

The invention preferably extends to a dispenser for soap and the like having a replaceable reservoir of liquid, the reservoir having an outlet orifice at its lower end and a reservoir outlet valve for controlling the flow from the outlet, a base unit having a spigot which engages with the outlet in the reservoir to open the valve, the base unit being provided with a fluid delivery system according to a first aspect of the present invention, the one-way inlet valve being arranged to control the flow of liquid through the spigot and into the cylinder.

The dispenser may be manually operated in which case the piston is moved by a hand-operated lever mechanism. However, preferably, the base unit is provided with a motor, a control circuit and a sensor to detect the presence of movement in the vicinity of the dispensing tube, the control circuit being arranged to drive the motor to move the piston when movement is detected. The dispenser may be a wall-mounted unit or one which is integrally built into a surrounding unit. However, it is preferably a free-standing unit, in which case the base unit preferably also comprises a battery compartment.

BRIEF DESCRIPTION OF THE DRAWINGS

An example of a fluid delivery system in accordance with the present invention will now be described with reference to the accompanying drawings, in which;

FIGS. 2A to 2K are schematic representations of the fluid delivery system showing various stages of operation.

DETAILED DESCRIPTION OF PREFERRED EMBODIMENTS

Figure 1:
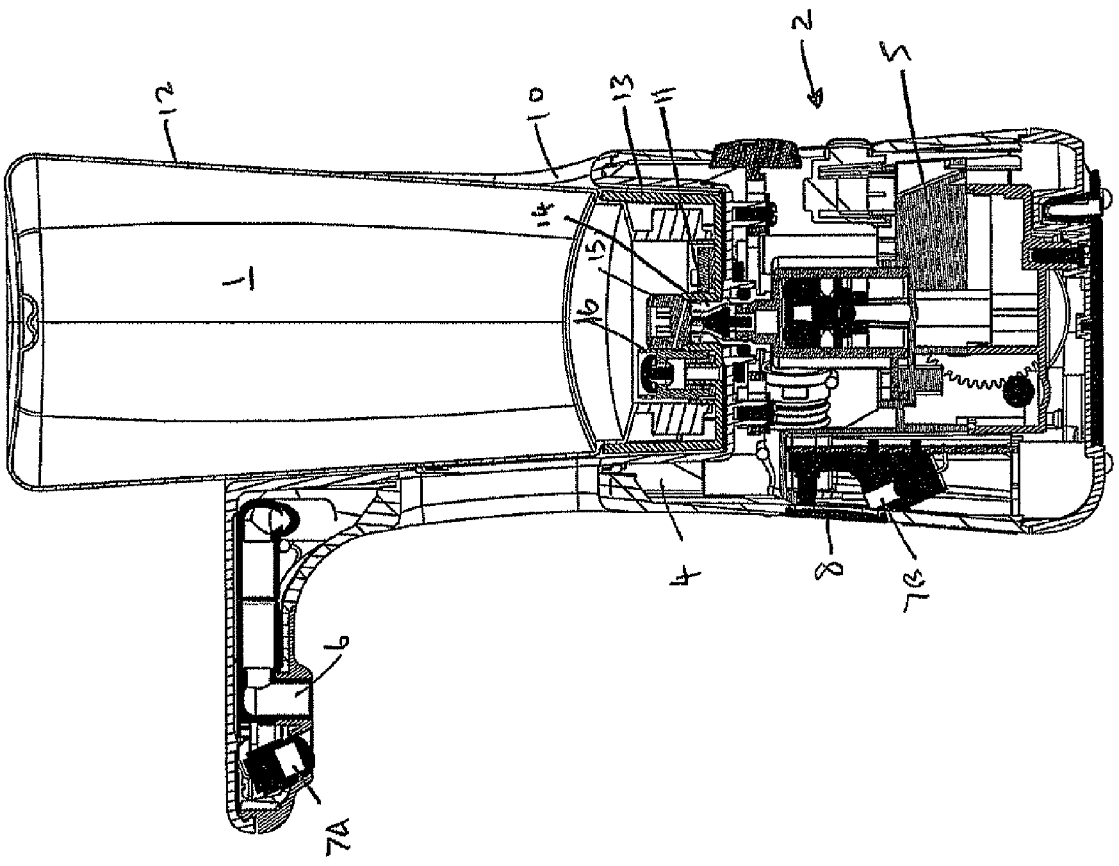
FIG. 1 is a cross-sectional view of dispenser for which the fluid delivery system is primarily designed.

The dispenser is a hands-free dispenser which is generally suitable for domestic use. The dispenser is primarily intended to dispense liquid soap, but may also be used to dispense other liquid or semi-liquid products (ideally with a viscosity greater than water), such as hand cream, body lotion, moisturiser, face cream, shampoo, shower gel, foaming hand wash, shaving cream, washing up liquid, toothpaste or a sanitising agent such as alcohol gel.

The dispenser comprises two main parts, namely a refill 1 and a base unit 2. The refill 1 provides a reservoir of liquid to be dispensed and is fitted to the base unit 2 as set out below.

The base has an interface into which liquid is dispensed from the refill unit as described with reference to the remaining drawings. The interface is in fluid communication with a dispensing tube 4. A pump as described below with a motor 5 is selectively operable to pump a metered dose of the liquid along dispensing tube 4 and out of dispensing head 6 as described in detail with reference to the remaining drawings.

The base has an infrared transmitter 7A which transmits an infrared beam through a window 8 to a receiver 7B to sense the presence of a user's hands in the vicinity of the dispenser. Control circuitry reacts to a signal from the proximity sensor to activate the pump. The illustrated sensor is a break beam sensor, but may also be a reflective sensor. Although an infrared sensor is shown, any known proximity sensor such as a capacitive sensor may be used. The device may be mains powered or battery powered. Alternatively, it may be a manually operated pump device in which a user pushes a lever to displace the product.

The base unit 2 comprises a cowling 10 which forms a cup-shaped housing surrounding a significant portion of the refill to protect and support it. A spigot 11 projects through the base of the cowling 10.

The refill 1 comprises a bottle 12 with a cap 13 attached at its lower end. At the lower end is an outlet 14 into which the spigot is inserted. The outlet 14 is closed by a valve element 15 which is resiliently biased onto the top of the annular wall of the outlet. The valve 15 is lifted from its seat upon insertion into the base 2 by the spigot 11. This opens up a flow path around the top of the spigot. An air Inlet valve 16 provides a vent which allows air into the bottle to replace lost liquid without interfering with the flow of liquid out of the dispenser.

The invention is concerned with the mechanism of the pump in the base unit and this will now be described with reference to FIGS. 2A to 2K.

As shown in FIG. 2A, an inlet valve element 17 is provided within a spigot 11. This inlet valve element 17 has a conical upper wall which seats on a complimentary valve seat 18. It could equally be a ball valve. The valve element 17 is retained to float within a spigot 11 by a cylinder housing 19, an upper portion of which projects into the spigot 11. This is sealed to the spigot by an O-ring 20.

The cylinder housing 19 defines a cylinder 21 in which a piston 22 is reciprocally mounted. The piston 22 is provided with an annular sealing ring 23 and a piston rod 24 which couples with a rotatable cam (not shown) driven by the motor 5 (FIG. 1). The cylinder 21 has an inlet orifice 25 flow through which is controlled by the previously described inlet valve element 17 and an outlet orifice 26 flow through which is controlled by an outlet valve element 27.

The end of the outlet valve element 27 closest to the cylinder 21 is relatively narrow and is arranged to slide within a retainer 28. At this point, the valve element 27 is provided with, a plurality of elongate grooves 29 to allow the passage of liquid. At the opposite end, the outlet valve element 27 is wider and is dimensioned to slide within outlet channel 30. At this point, the valve element has a plurality of notches 31 which also allow for the flow of liquid. Below the enlarged portion is an O-ring 32 which lands on conical seat 33 in order to seal the outlet.

The outlet valve element 27 is biased towards the cylinder 21 (to the left as shown in FIG. 2A) by a spring 34. The outlet chamber 30 leads to the dispensing tube 4 which has an outlet 35. Relating back, to FIG. 1, this outlet 35 effectively provides the dispensing head 6.

The operation of the system will now be described.

In FIG. 2A, the piston is shown before first use and in an unprimed condition with the piston 22 In the uppermost position and the inlet 17 and outlet 27 both open. It should be noted that this is not the normal position that the piston will return to at the end of a cycle as described below.

Figure 2B:
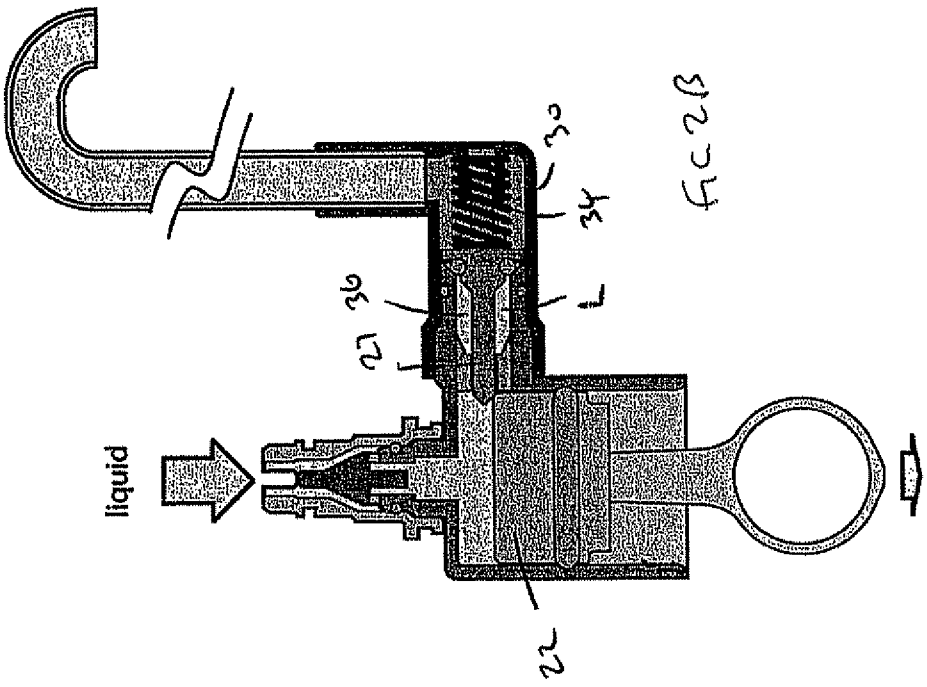
Figure 2C:
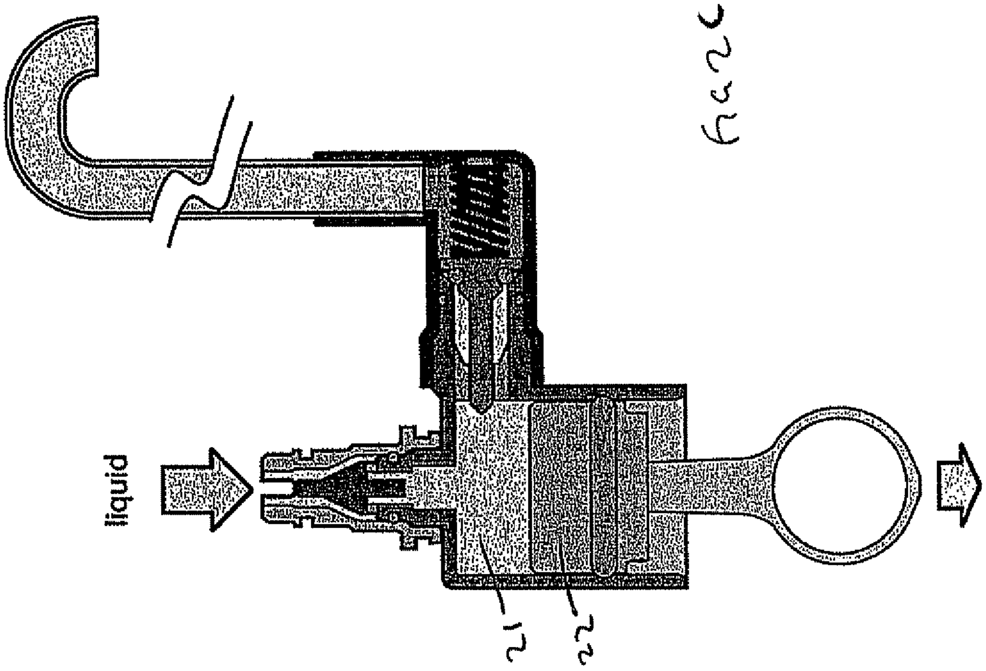
Figure 2D:
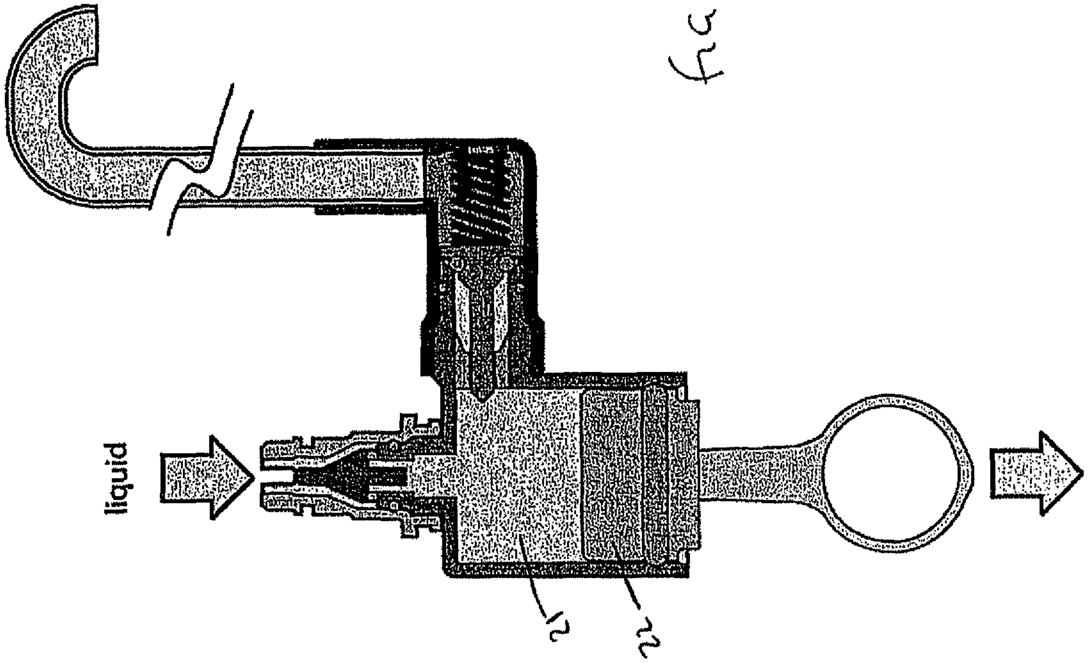

With the piston in this unprimed condition, the refill 1 is inserted into the base unit 2 as shown in FIG. 1. When the sensor 7A, 7B detects the presence of movement in the vicinity of the dispensing head 6, the motor 5 drives the piston downwardly as shown in FIG. 2B. In this position, liquid is drawn down past the inlet valve 17 and into the cylinder 21. During this initial movement, the outlet valve element 27 remains open, so that liquid fills the chamber 36 surrounding the outlet valve element and may even flow further into the outlet chamber 30.

As soon as the piston 22 reaches the position shown in FIG. 2B in which it is beneath the outlet valve element 27, the spring 34 urges the outlet valve element 27 into the closed position as shown in FIG. 2B in which the sealing ring 32 lands on seat 33 to seal the outlet. Further downward movement of the piston via the position shown in FIG. 2C to the position shown in FIG. 2D fills the cylinder 22 with liquid.

Figure 2E:
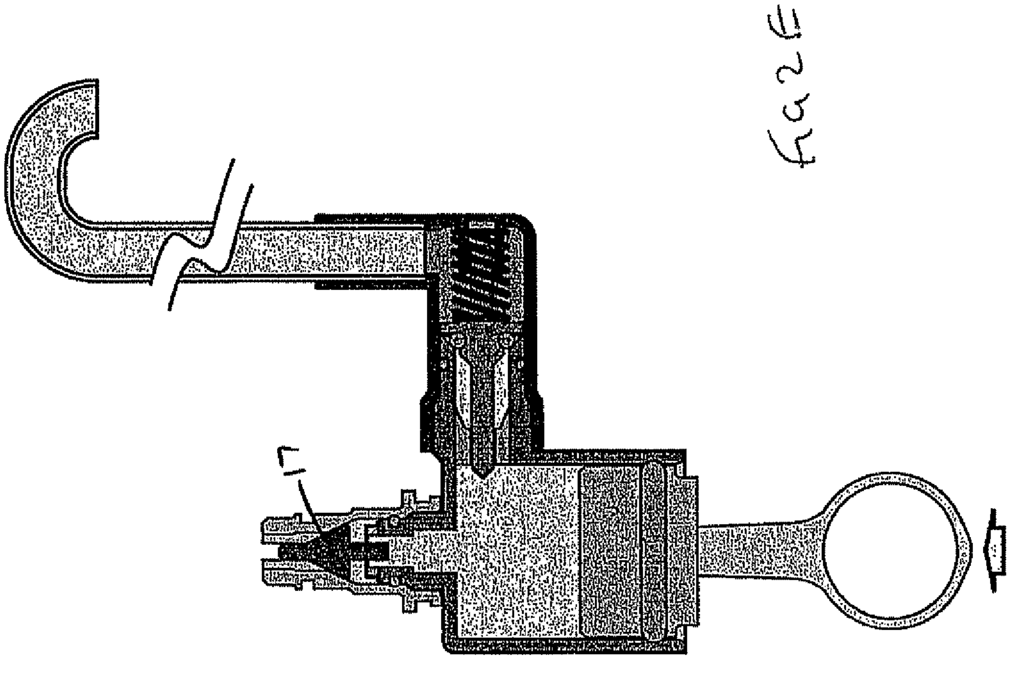
Figure 2F:
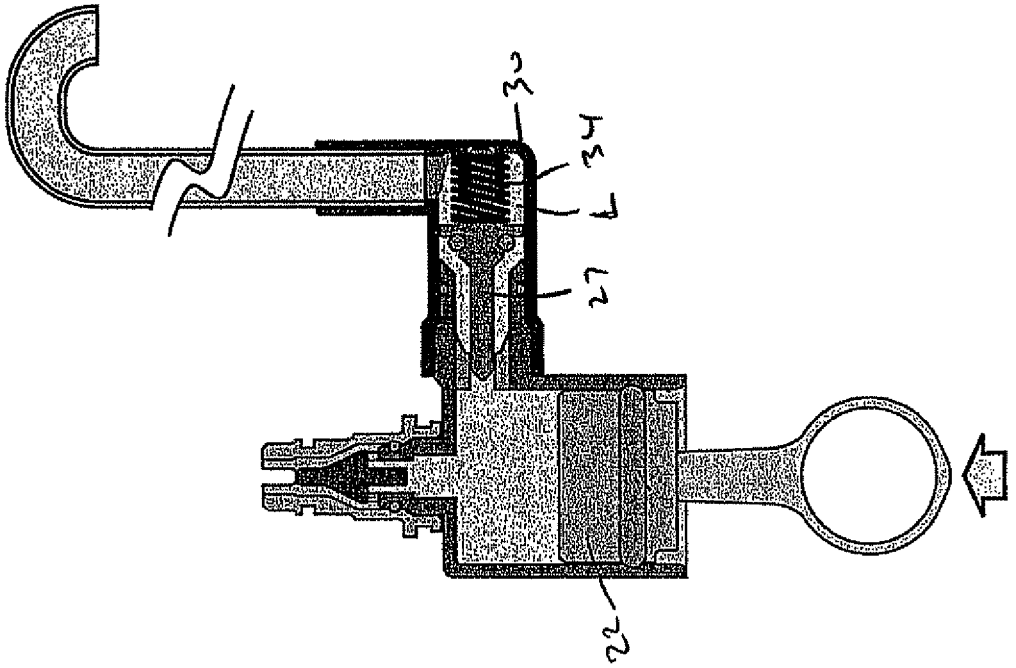
Figure 25:
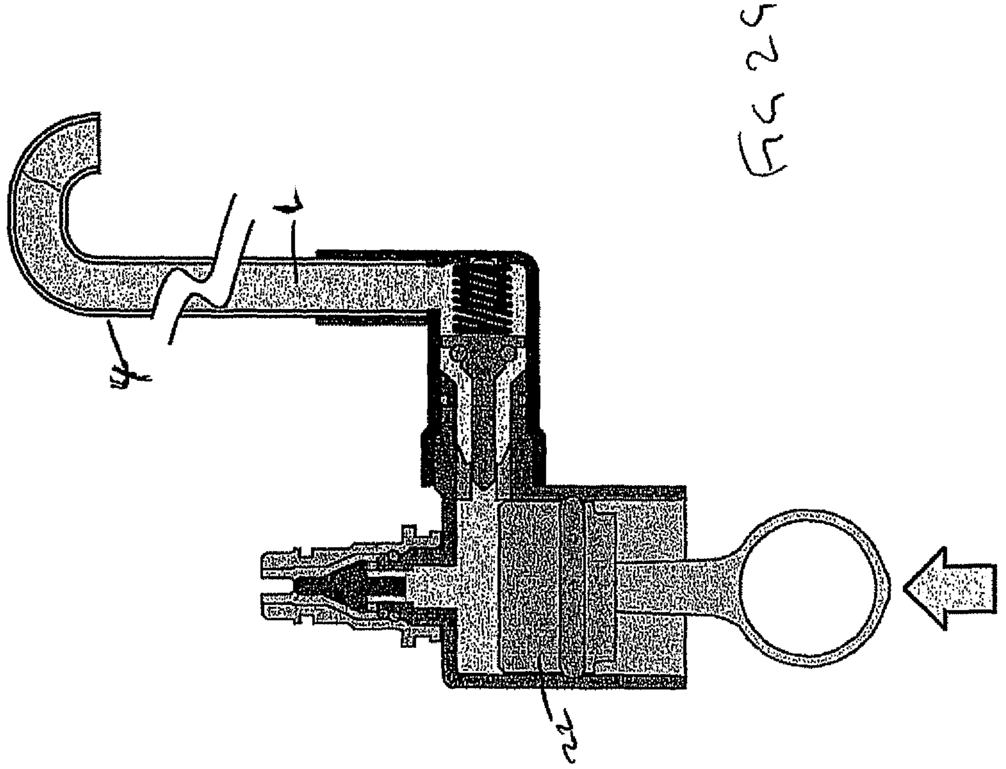
Figure 24:
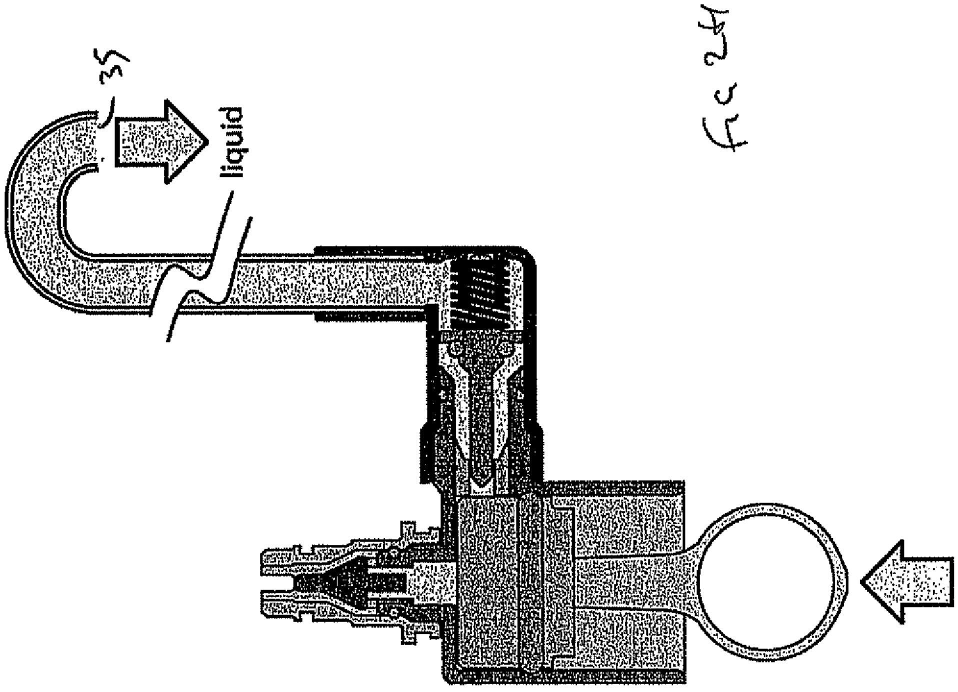
Figure 2E:
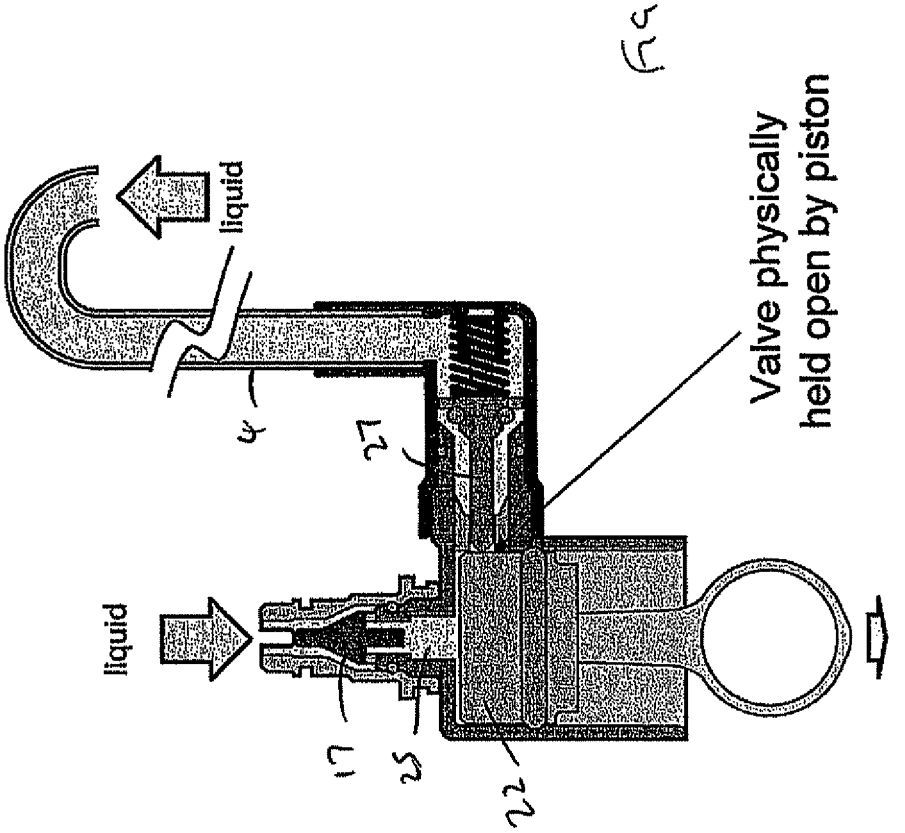
Figure 25:
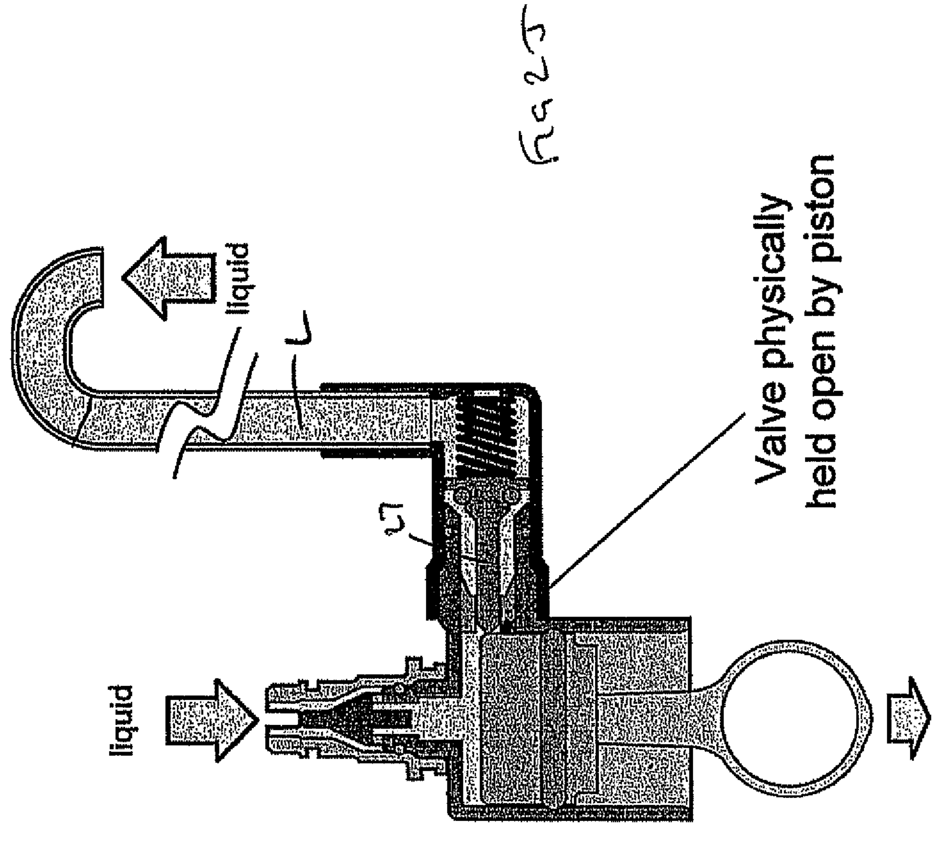

The piston 22 reaches bottom dead centre and then reverses as shown in FIG. 2E. The increase in flow pressure that this generates closes the inlet valve 17 as shown in FIG. 2E. As the piston continues its upward stroke as shown in FIG. 2F, the liquid pressure on the outlet valve 27 overcomes the biasing force provided by the spring 34 and liquid L enters the outlet housing 30. Continued upward movement of the piston 22 forces the liquid L up the dispensing tube 4 as shown in FIG. 2G and ultimately out of the outlet 35 as shown in FIG. 2H until the piston reaches top dead centre.

The pump is now primed. The piston 22 then reverses as shown in FIG. 2I. At this point, the outlet valve element 27 is prevented from closing as the tip of the valve element is obstructed by the side wall of the piston 22 while moving to the closed position. This downward movement of piston 22 re-opens the inlet valve element 17 sucking liquid in through inlet 25 as well as sucking liquid back down the dispensing tube 4 around the valve element 27 as shown in FIG. 2J.

Once the piston 22 passes the outlet valve element 27, the valve element 27 closes and liquid is drawn into the cylinder 21 until the piston approaches bottom dead centre just above the position shown in FIG. 2K (approximately 75% of the downstroke). This is the at rest position L of the pump during normal use. In this position, the cylinder 21 is filled with liquid and the dispense tube 4 is full of liquid L up to a level which is beneath uppermost part of the lower surface of the discharge tube. Thus, the liquid has been sucked back to a location at which it cannot flow through the outlet under gravity. When movement is detected by sensors 7A, 7B to trigger the next dispensing operation, the piston first travels down to bottom dead centre (the remaining 25% of its stroke) to fully prime the cylinder before completing a full upstroke to dispense the liquid and 75% of the downstroke to return to the "at rest" position of FIG. 2K.

The invention claimed is:

1. A fluid delivery system comprising:

a pump arranged to draw fluid, in use, from a reservoir and dispense it through a dispensing tube, the pump comprising a cylinder in which a piston is reciprocally movable;

an inlet into the cylinder;

a one-way inlet valve for controlling flow through the inlet;

an outlet from the cylinder and leading to the dispensing tube; and an outlet valve located in the outlet and having a tip proximal the piston and movable into the cylinder beyond an initial portion of the downstoke of the piston, the outlet valve controlling flow through the outlet, and in a closed position when the tip of the outlet valve enters the cylinder, and in an open position when the tip of the outlet valve is obstructed from entering the cylinder, wherein both the inlet valve and the outlet valve are simultaneously open during the initial portion of the downstroke of the piston, the outlet valve open as the outlet valve is prevented from the closed position while the tip of the valve element is obstructed from entering the cylinder by a side wall of the piston in proximity to the outlet, and the inlet valve open as the downstoke of the piston re-opens the inlet valve;

wherein while both the inlet valve and the outlet valve are open, fluid from a reservoir is drawn through the inlet, and at least a portion of fluid in the dispensing tube is drawn back to the cylinder through the outlet; and wherein the piston is to release the outlet valve to close for the remainder of the downstroke when the tip of the outlet valve is no longer obstructed to enter the cylinder by the side wall of the piston.

2. A system according to claim 1, wherein the outlet valve comprises a valve element positioned in an orifice at a side wall of the cylinder and biased to a closed position in which the valve element projects into the cylinder, the valve element being arranged to be opened by the piston moving in the cylinder past the outlet valve element and pushing the projecting part of the valve element out of the cylinder against the action of the biasing force.

3. A system according to claim 1, wherein the inlet valve comprises a floating valve element.

4. A system according to claim 1, wherein the dispensing tube comprises an upward portion extending away from the piston leading into a curved transitional portion, the curved transitional portion leading to a generally downwardly facing outlet.

5. A system according to claim 4, wherein the piston is configured to suck the liquid back to a location, which is back beyond the point where it could flow out of the outlet under gravity.

6. A dispenser for soap and the like having a replaceable reservoir of liquid, the reservoir having an outlet orifice at its lower end and a reservoir outlet valve for controlling the flow from the outlet, a base unit having a spigot which engages with the outlet in the reservoir to open the valve, the base unit being provided with a fluid delivery system according to claim 1, the one-way inlet valve being arranged to control the flow of liquid through the spigot and into the cylinder.

7. A dispenser according to claim 6, wherein the base unit is provided with a motor, a control circuit and a sensor to detect the presence of movement in the vicinity of the dispensing tube, the control circuit being arranged to drive the motor to move the piston when movement is detected.

8. A dispenser according to claim 6, the dispenser being a free standing unit.

9. A dispenser according to claim 8, wherein the dispenser is battery powered.

10. A fluid delivery system comprising:

a pump arranged to draw fluid, in use, from a reservoir and dispense it through a dispensing tube, the pump comprising a cylinder in which a piston is reciprocally movable;

an inlet into the cylinder;

a one-way inlet valve for controlling flow through the inlet;

an outlet from the cylinder and leading to the dispensing tube; and an outlet valve controlling flow through the outlet, wherein the piston is arranged to selectively contact the outlet valve to maintain it open during the initial portion of its downstroke, while simultaneously opening the inlet valve, such that the inlet valve is also open during the initial portion of the piston's downstroke, to permit the flow of fluid into the cylinder, and to release the outlet valve to close for the remainder of the downstroke;

wherein the outlet valve comprises a valve element positioned in an orifice at a side wall of the cylinder and biased to a closed position in which the valve element projects into the cylinder, the valve element being arranged to be opened by the piston moving in the cylinder past the outlet valve element and pushing the projecting part of the valve element out of the cylinder against the action of the biasing force;

wherein the inlet valve comprises a floating valve element;

wherein the dispensing tube comprises an upward portion extending away from the piston leading into a curved transitional portion, the curved transitional portion leading to a generally downwardly facing outlet; and wherein the piston is configured to suck the liquid back to a location, which is back beyond the point where it could flow out of the outlet under gravity.

11. A dispenser for soap and the like having a replaceable reservoir of liquid, the reservoir having an outlet orifice at its lower end and a reservoir outlet valve for controlling the flow from the outlet, a base unit having a spigot which engages with the outlet in the reservoir to open the valve, the base unit being provided with a fluid delivery system according to claim 10, the one-way inlet valve being arranged to control the flow of liquid through the spigot and into the cylinder.

* * * * *